US007697852B2

(12) United States Patent
Kuboki

(10) Patent No.: US 7,697,852 B2
(45) Date of Patent: Apr. 13, 2010

(54) IMAGE FORMING APPARATUS, IMAGE FORMING METHOD AND STORAGE MEDIUM THEREFOR CAPABLE OF FORMING TRIAL IMAGES UNDER DIFFERENT CONDITIONS

(75) Inventor: Keiju Kuboki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1049 days.

(21) Appl. No.: 11/248,200

(22) Filed: Oct. 13, 2005

(65) Prior Publication Data

US 2006/0082800 A1 Apr. 20, 2006

Related U.S. Application Data

(62) Division of application No. 10/840,397, filed on May 7, 2004, now Pat. No. 6,973,273, which is a division of application No. 09/866,789, filed on May 30, 2001, now Pat. No. 6,757,500.

(30) Foreign Application Priority Data

May 31, 2000 (JP) ............................ 2000-161857

(51) Int. Cl.
*G03G 15/00* (2006.01)
(52) U.S. Cl. .......................... 399/15; 399/85
(58) Field of Classification Search .................. 399/15, 399/43, 79, 81, 82, 85, 407; 358/1.16, 1.17
See application file for complete search history.

(56) References Cited

U.S. PATENT DOCUMENTS

| 4,448,515 A | 5/1984 | Ishikawa ...................... 355/14 |
| 5,555,099 A | 9/1996 | Telle .......................... 358/401 |
| 5,987,227 A | 11/1999 | Endo et al. ................... 395/112 |
| 6,122,457 A | 9/2000 | Kizaki ......................... 399/11 |
| 6,172,761 B1 | 1/2001 | Ohtani ....................... 358/1.12 |
| 6,453,133 B1 | 9/2002 | Osari et al. ................... 399/82 |
| 6,542,257 B2 | 4/2003 | Kutsuwada et al. ......... 358/1.18 |
| 6,757,500 B2 | 6/2004 | Kuboki ........................ 399/15 |
| 6,973,273 B2* | 12/2005 | Kuboki ........................ 399/15 |
| 2006/0082800 A1* | 4/2006 | Kuboki ..................... 358/1.13 |

FOREIGN PATENT DOCUMENTS

| JP | 8-95436 | 4/1996 |
| JP | 8-248831 | 9/1996 |

(Continued)

*Primary Examiner*—Robert Beatty
(74) *Attorney, Agent, or Firm*—Fitzpatrick, Cella, Harper & Scinto

(57) ABSTRACT

An image forming apparatus includes an operation unit configured to execute a control method of setting an image forming condition, inputting image data, determining to execute trial image forming, and controlling an image forming device to execute the trial image forming. The control method also includes the steps of accepting a change instruction for changing the set image forming condition, and controlling the image forming device, in a case where the change instruction is accepted, based on inputted image data and the changed image forming condition, and in a case where the change instruction is not accepted, based on inputted image data and the set image forming condition. The method also determines, in the case where the change instruction is accepted, whether or not to again execute the trial image forming.

8 Claims, 11 Drawing Sheets

FOREIGN PATENT DOCUMENTS

| | | |
|---|---|---|
| JP | 10-119365 | 5/1998 |
| JP | 11-174903 | 7/1999 |
| JP | 11196245 A * | 7/1999 |
| JP | 11-249512 | 9/1999 |
| JP | 2000-122479 | 4/2000 |

* cited by examiner

IMAGE FORMING APPARATUS, IMAGE FORMING METHOD AND STORAGE MEDIUM THEREFOR CAPABLE OF FORMING TRIAL IMAGES UNDER DIFFERENT CONDITIONS

This application is a divisional application of U.S. patent application Ser. No. 10/840,397, filed on May 7, 2004, which issued as U.S. Pat. No. 6,973,273, and which is a divisional application of U.S. patent application Ser. No. 09/866,789, filed on May 30, 2001, which issued as U.S. Pat. No. 6,757,500.

BACKGROUND OF THE INVENTION

1. Field of the Invention

The present invention relates to an image forming apparatus such as a digital copying machine or the like.

2. Related Background Art

Digital copying machines, which were developed only recently, are now in widespread use.

One such digital copying machine uses a CCD to read an image and produce an image signal, converts the image signal into a digital signal from which, after it is subjected to various processes, a laser signal is obtained and used for an electrophotographic technique that reproduces the original image on a recording medium.

Another digital copying machine has been developed that temporarily stores an image signal in image memory, such as on a hard disk, and later reads the signal and uses it for image forming. According to this technique, once a scanner has read an image, the obtained signal can repetitively be used for image forming, and not only can multiple copies be produced, but the technique can be effectively employed for a function such as digital sorting.

Further, since image memory is included, a trial copying function has been proposed whereby after one set of images has been copied a user may confirm the results and either instruct that image forming be continued or that the setting mode be changed.

Conventionally, however, for the trial copying function, no consideration is given to the intent of a user concerning how many copies remain to be printed after the trial printing has been completed and before the final image printing is initiated.

For example, when the trial copying of one set is performed, and the user is satisfied and instructs that the copying be continued, the trial copy can be regarded as a regular copy, and the count of the remaining copies can be obtained by decrementing by one the numeral that was originally set.

Further, when after the trial copying a mode change is instructed, it is assumed the user was not satisfied with the trial copy, and for the continuous copying process, the count of the images to be formed is the numeral that was originally set.

However, since for the conventional technique no method is provided for controlling the number of images to be produced at the time of the trial copying, depending on the situation, the user must change the copy count each time.

SUMMARY OF THE INVENTION

To resolve the above shortcomings, an image forming apparatus, an image forming method, and a storage medium therefor are provided.

According to the present invention, the control method of an image forming apparatus which has image forming means is provided. The method includes a setting step of setting an image forming condition, an inputting step of inputting image data, and a first determining step of determining to execute trial image forming. Also included are a first controlling step of controlling the image forming means to execute the trial image forming based on the image data input in the inputting step, according to a determination in the first determining step to execute the trial image forming, and an accepting step of accepting a change instruction for changing the image forming condition set in the setting step, in a case where the image forming is executed in the first controlling step.

The method further includes a second controlling step of controlling, in a case where the change instruction is accepted in the accepting step, the image forming means to execute the image forming based on the image data input in the inputting step and the image forming condition changed according to the change instruction. The second controlling step also controls, in a case where the change instruction is not accepted in the accepting step, the image forming means to execute the image forming based on the image data input in the inputting step and the image forming condition set in the setting step. The method also includes a second determining step of determining, in the case where the change instruction is accepted in the accepting step, whether or not to again execute the trial image forming.

Furthermore, according to the present invention, an image forming apparatus which has image forming means is provided. The image forming apparatus comprises an operation unit configured to execute a control method including, a setting step of setting an image forming condition, an inputting step of inputting image data, and a first determining step of determining to execute trial image forming. Also included are a first controlling step of controlling the image forming means to execute the trial image forming based on the image data input in the inputting step, according to a determination in the first determining step to execute the trial image forming, and an accepting step of accepting a change instruction for changing the image forming condition set in the setting step, in a case where the image forming is executed in the first controlling step.

The method further includes a second controlling step of controlling, in a case where the change instruction is accepted in the accepting step, the image forming means to execute the image forming based on the image data input in the inputting step and the image forming condition changed according to the change instruction. The second controlling step also controls, in a case where the change instruction is not accepted in the accepting step, the image forming means to execute the image forming based on the image data input in the inputting step and the image forming condition set in the setting step. The method also includes a second determining step of determining, in the case where the change instruction is accepted in the accepting step, whether or not to again execute the trial image forming.

Still further, according to the present invention, a computer-readable storage medium for an image forming apparatus which has image forming means is provided. The storage medium stores a program which causes the image forming apparatus to execute a setting step of setting an image forming condition, an inputting step of inputting image data, and a first determining step of determining to execute trial image forming. Also included are a first controlling step of controlling the image forming means to execute the trial image forming based on the image data input in the inputting step, according to a determination in the first determining step to execute the trial image forming, and an accepting step of accepting a change instruction for changing the image forming condition set in the setting step, in a case where the image forming is executed in the first controlling step.

The method further includes a second controlling step of controlling, in a case where the change instruction is accepted in the accepting step, the image forming means to execute the image forming based on the image data input in the inputting step and the image forming condition changed according to the change instruction. The second controlling step also controls, in a case where the change instruction is not accepted in the accepting step, the image forming means to execute the image forming based on the image data input in the inputting step and the image forming condition set in the setting step. The method also includes a second determining step of determining, in the case where the change instruction is accepted in the accepting step, whether or not to again execute the trial image forming.

Other features and configurations of, and effects produced by the present invention will become apparent during the course of the following detailed explanation given while referring to the accompanying drawings.

DETAILED DESCRIPTION OF THE PREFERRED EMBODIMENTS

The preferred embodiments of the present invention will now be described.

Figure 1:
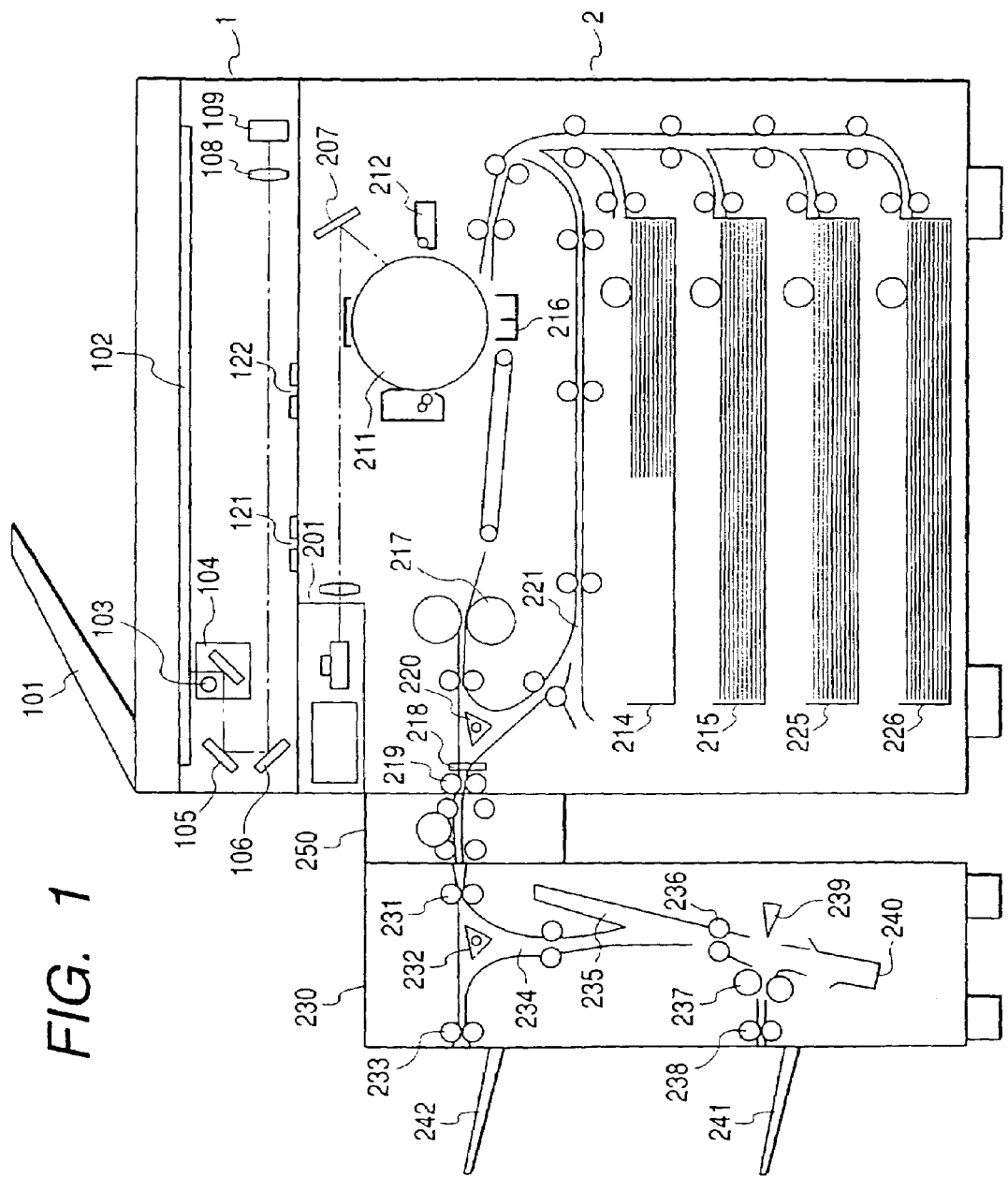
FIG. 1 is a cross-sectional view of the essential portion of an image forming apparatus that is a digital copying machine according to the present invention.
Figure 2:
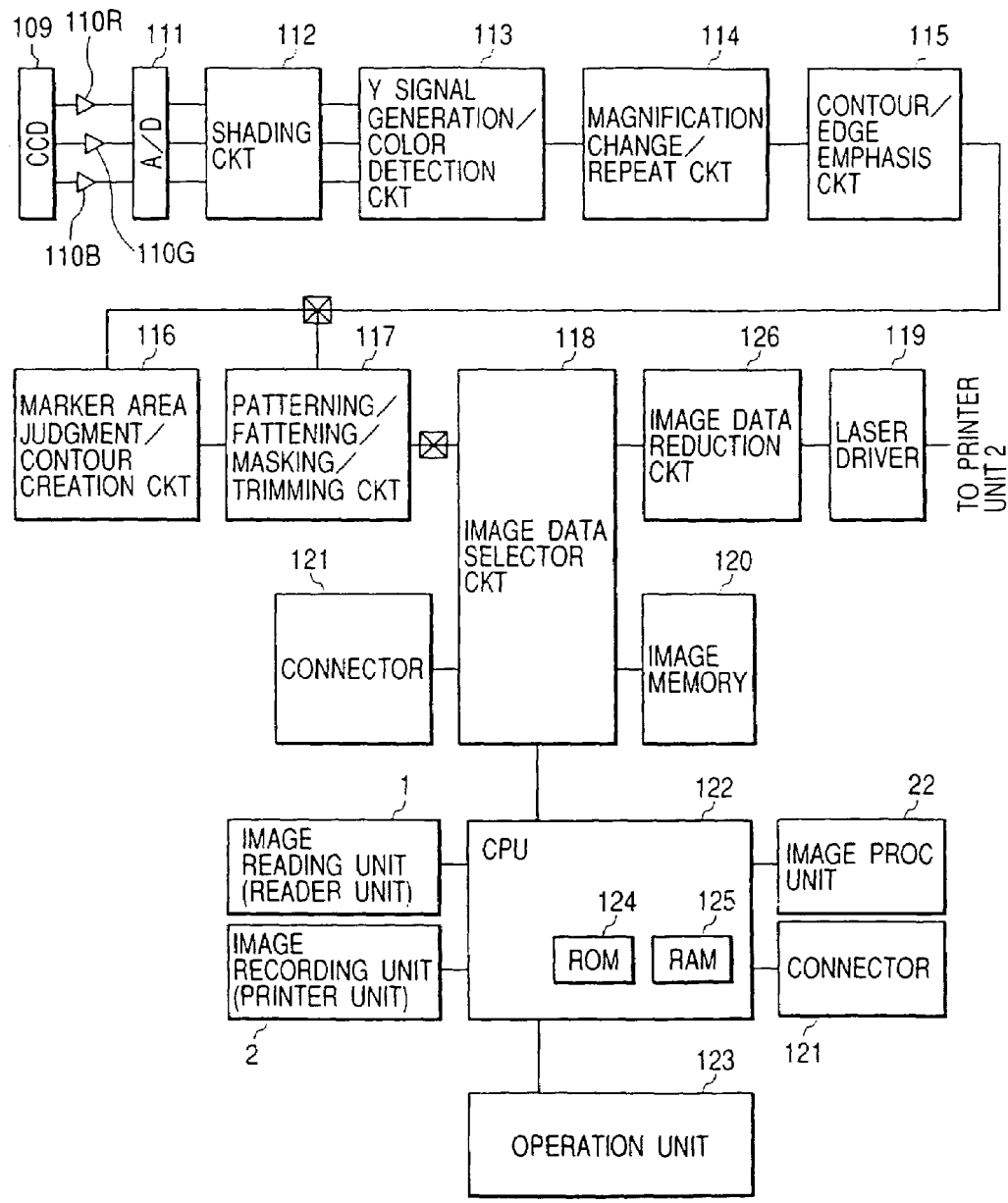
FIG. 2 is a block diagram showing the configuration of a signal processing circuit and the essential portion of a reader.
Figure 3:
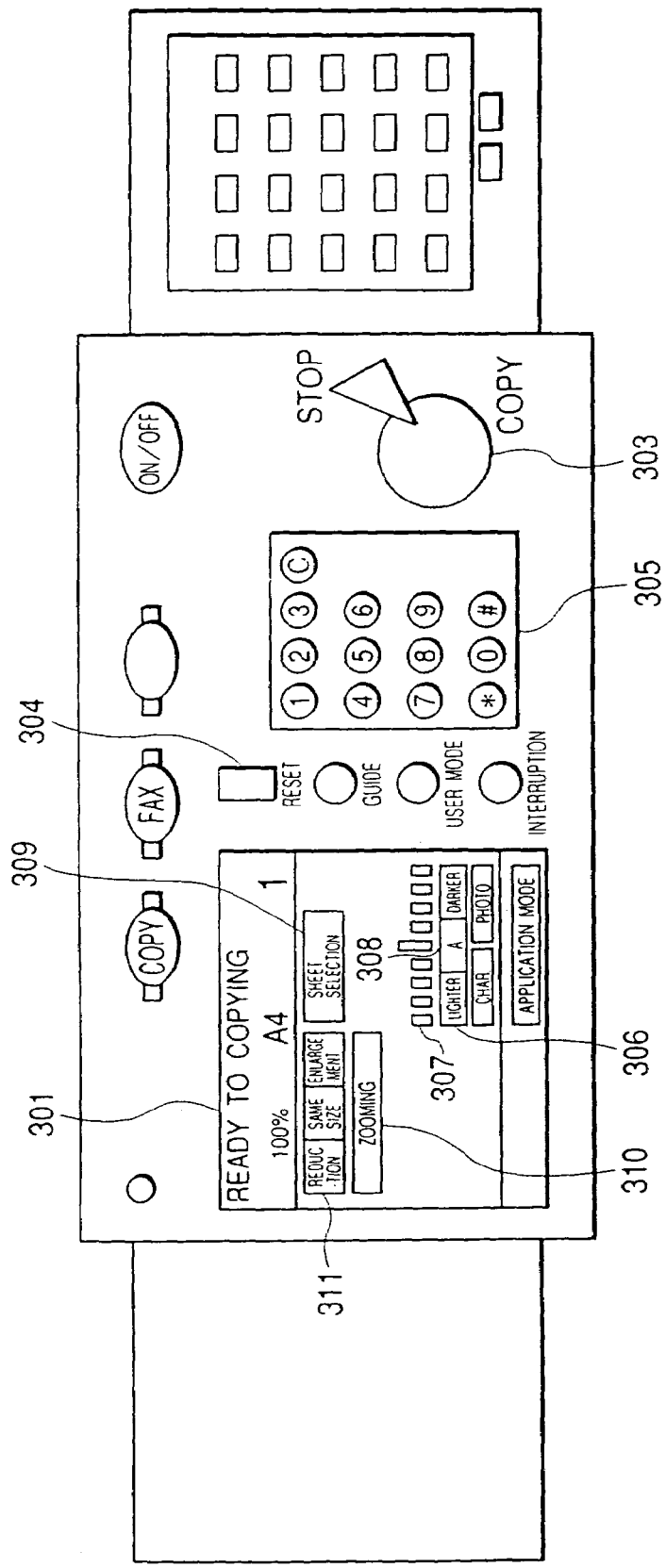
FIG. 3 is a detailed diagram used for explaining an operation unit 123.
Figure 5:
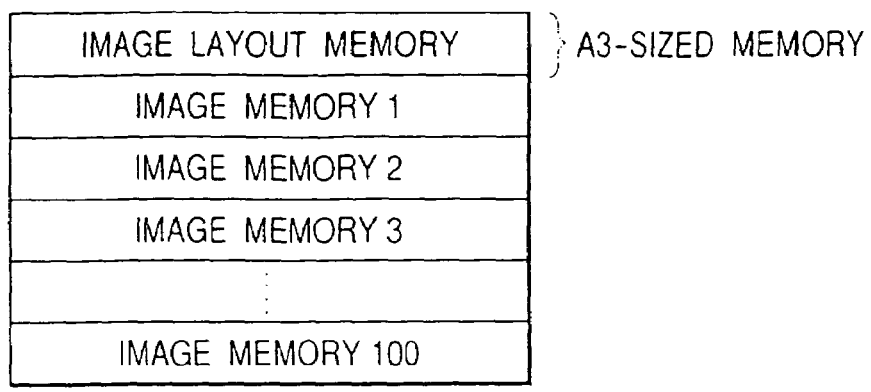
FIG. 5 is a diagram for explaining an example image storage method.
Figure 6:
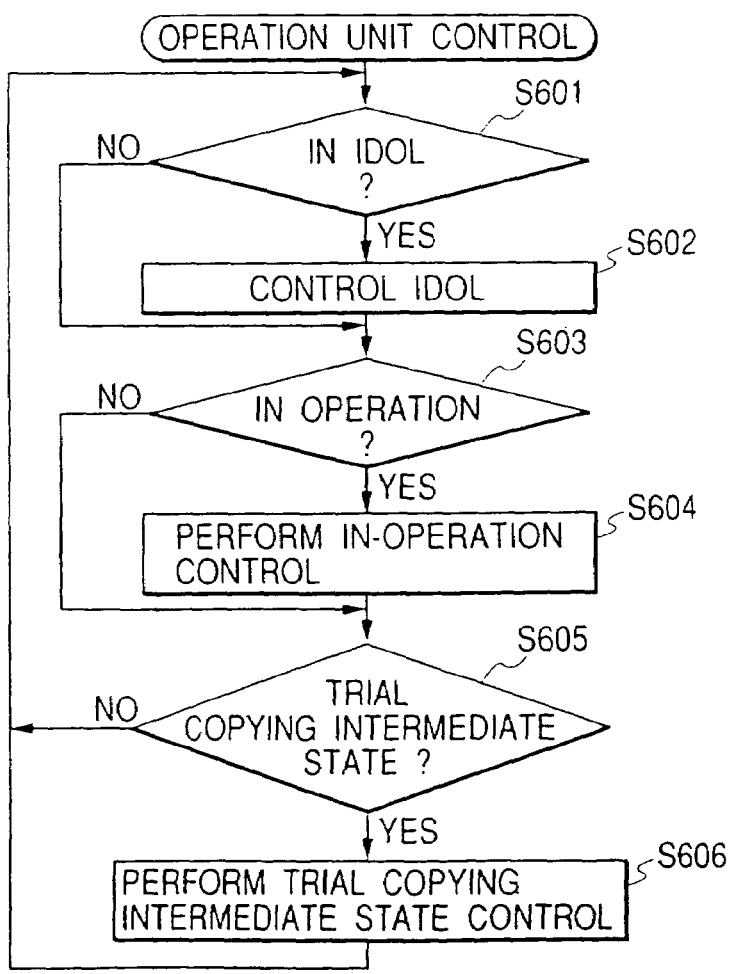
FIG. 6 is a flow chart for a control task for the operation unit 123.
Figure 7:
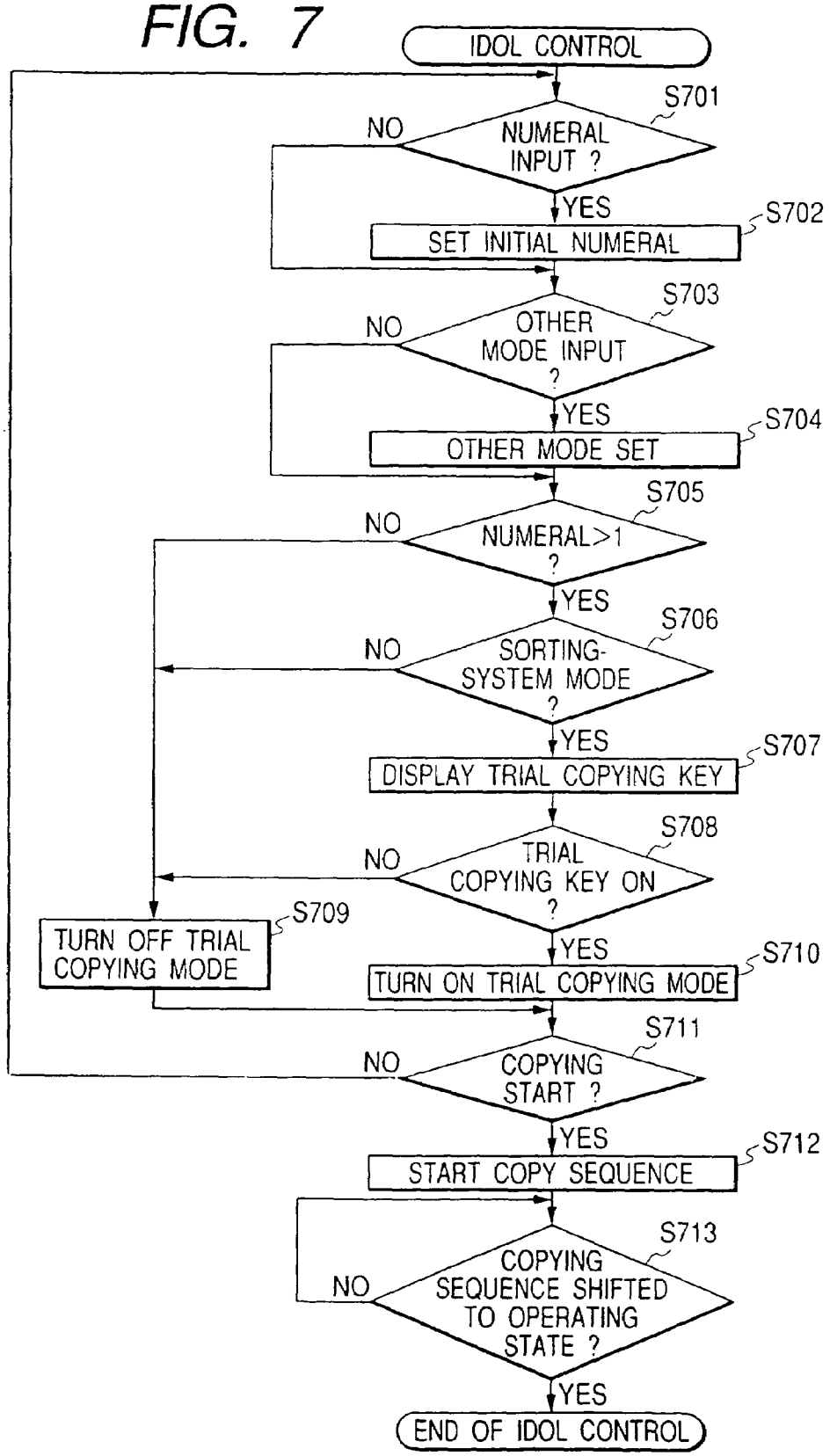
FIG. 7 is a flow chart for a trial copying process during the control operation while in the idle state of the operation unit 123.
Figure 8:
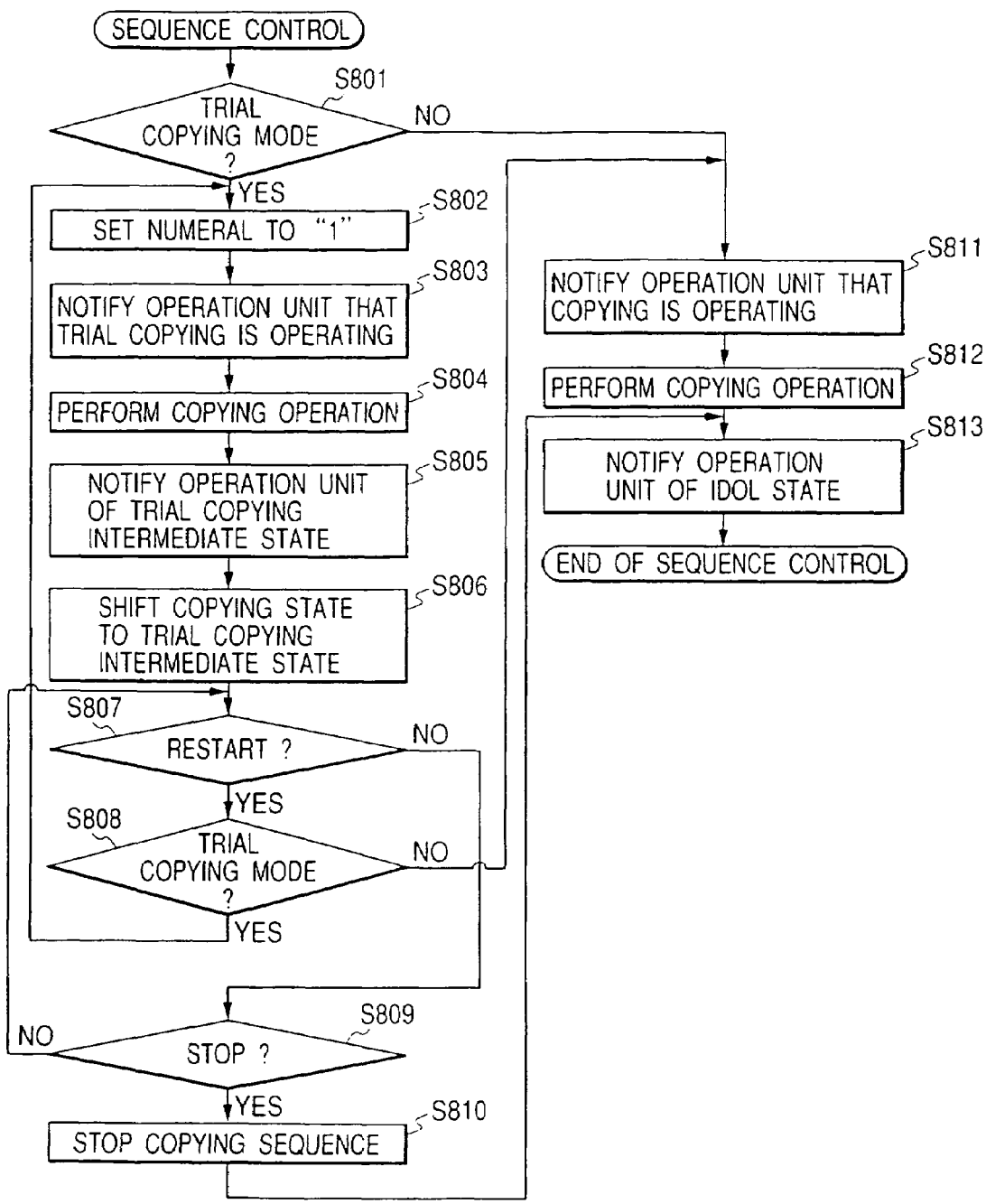
FIG. 8 is a flow chart for the control of a copying sequence task according to the present invention.
Figure 9:
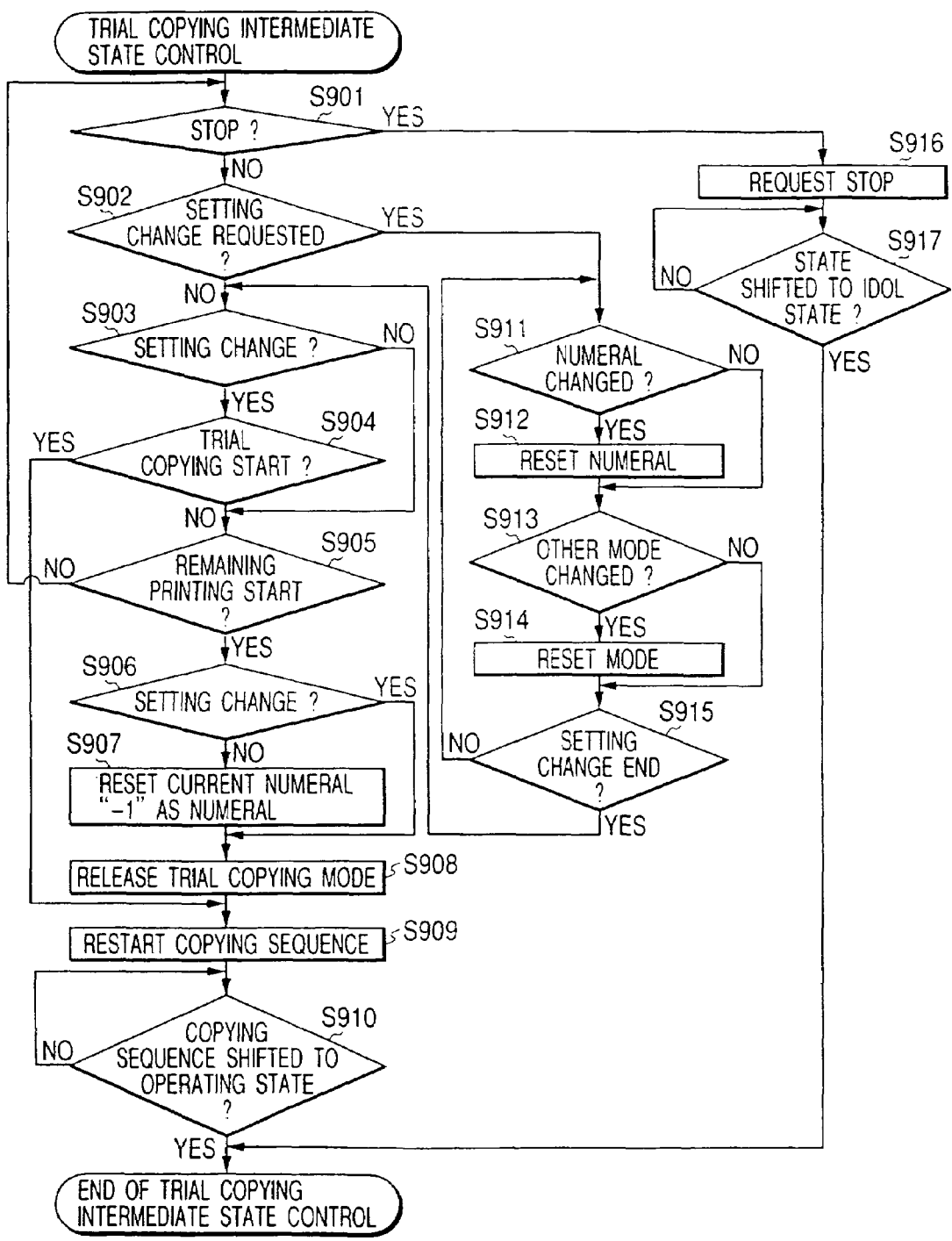
FIG. 9 is a flow chart for a trial copying intermediate state control operation.
Figure 10:
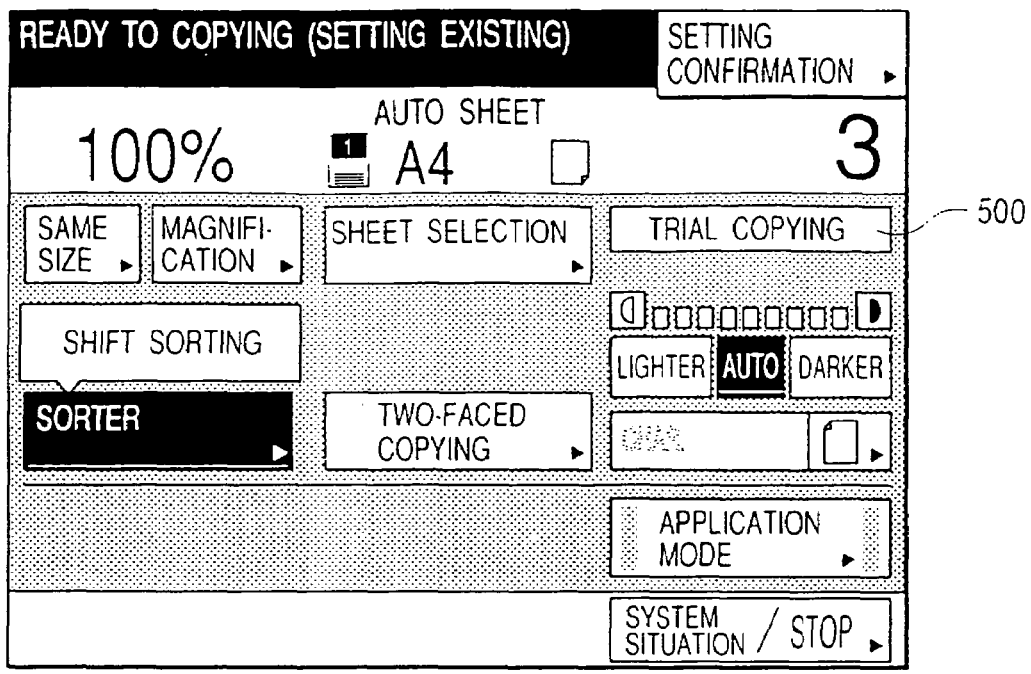
FIG. 10 is a diagram showing a copying mode setting screen in the idle state.
Figure 11:
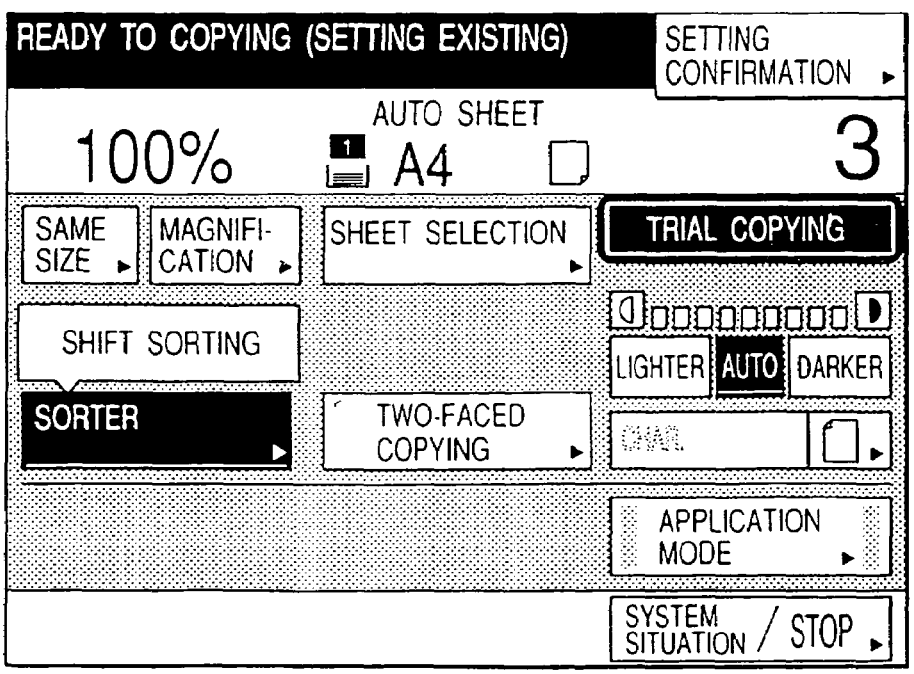
FIG. 11 is a diagram showing a trial copying mode ON display screen.
Figure 12:
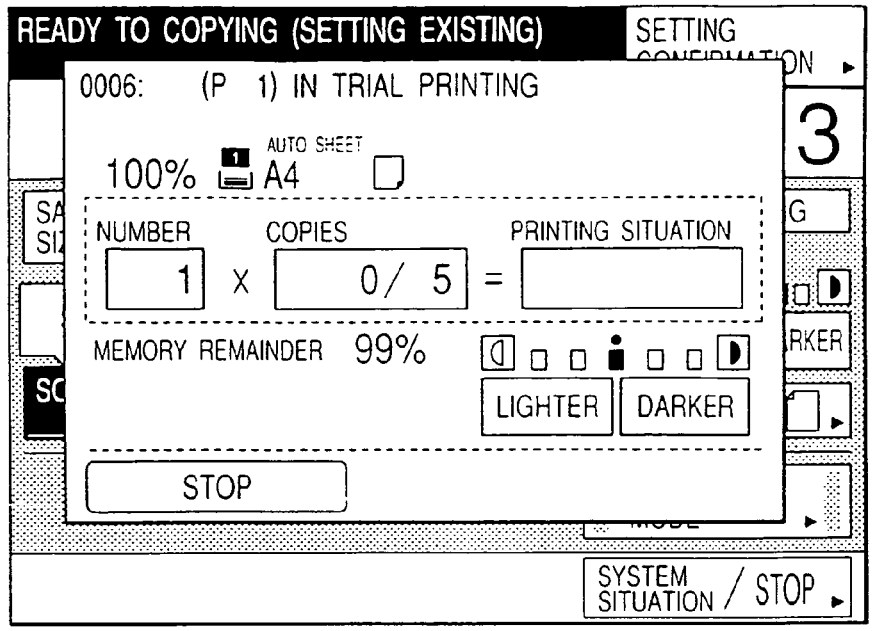
FIG. 12 is a diagram showing a trial copying display screen.
Figure 13:
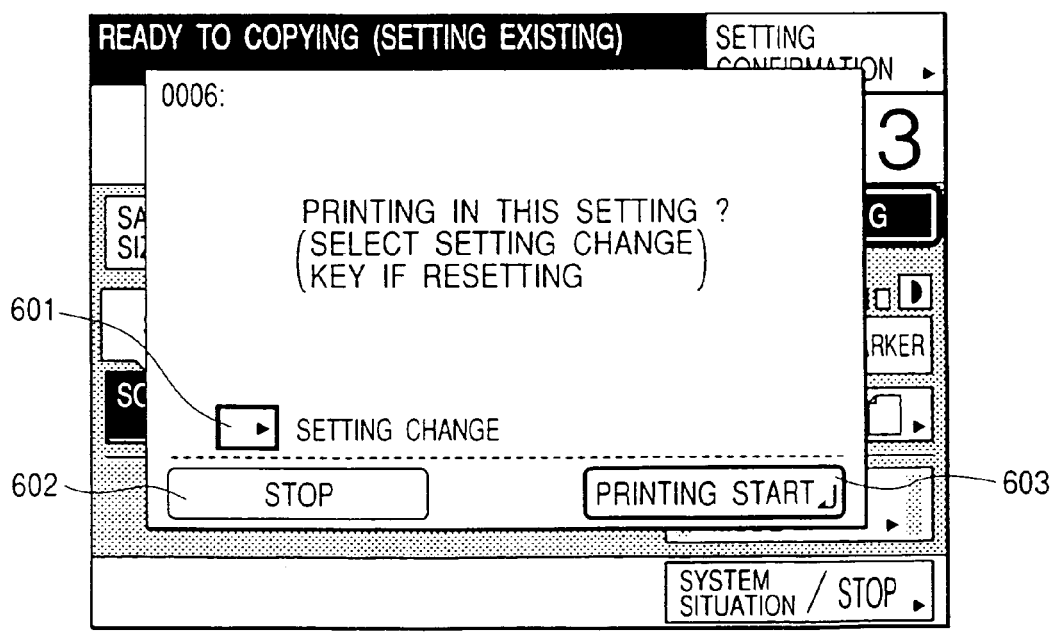
FIG. 13 is a diagram showing a setting change selection screen.
Figure 14:
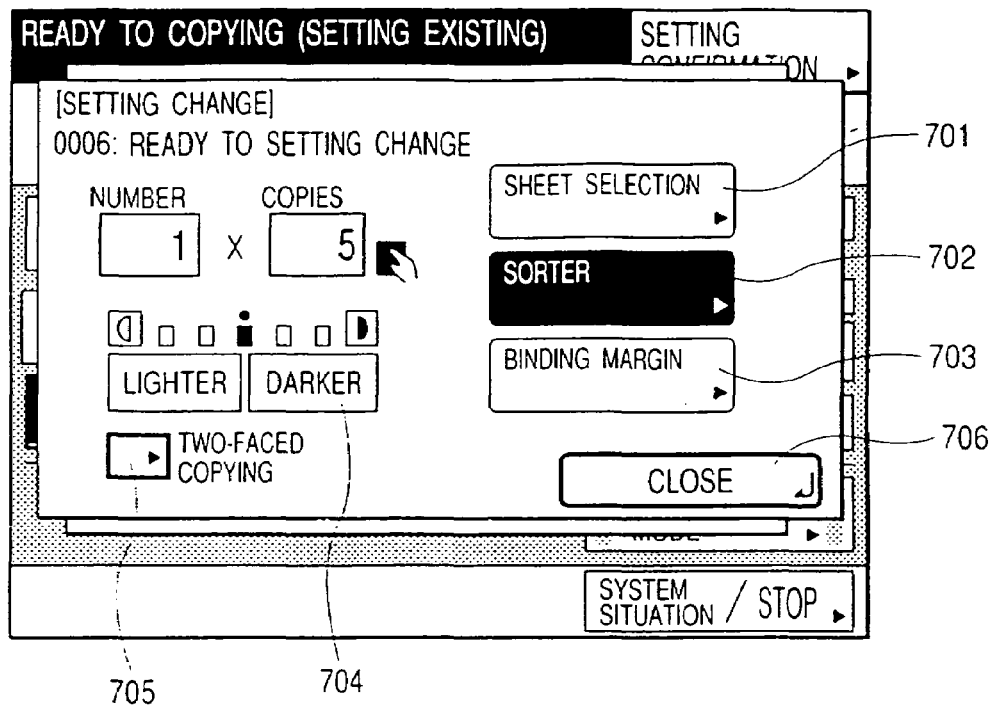
FIG. 14 is a diagram showing a reset screen.
Figure 15:
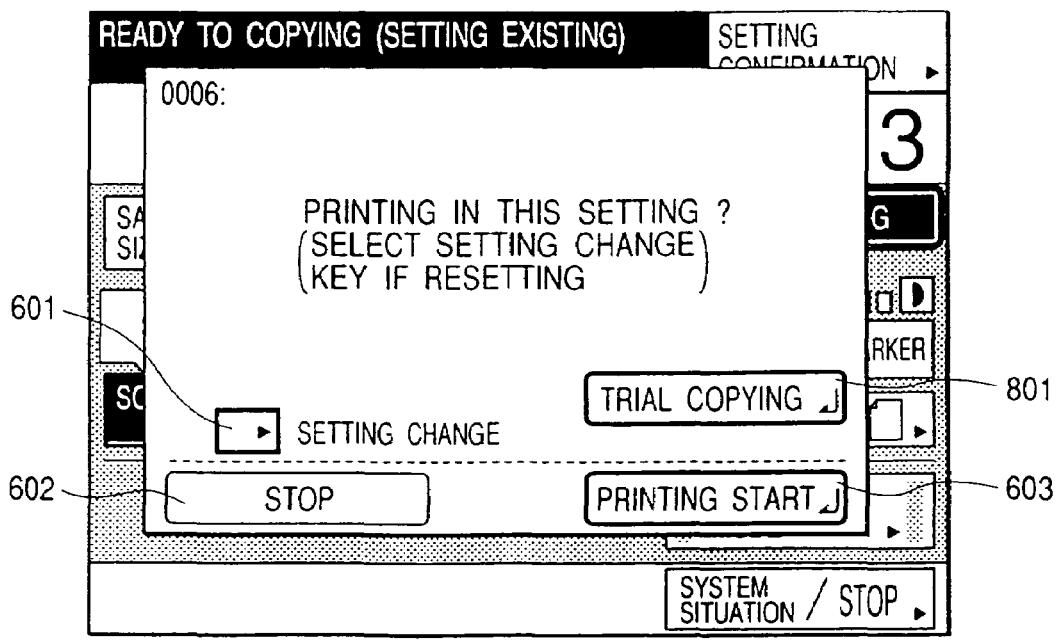
FIG. 15 is a diagram showing a trial copying display screen after the reset.

FIG. 1 is a side cross-sectional view of the essential portion of an image forming apparatus that is a digital copying machine according to the present invention; FIG. 2 is a block diagram showing an example structure for a signal process circuit and the essential portion of a reader; FIG. 3 is a detailed diagram for explaining an operation unit 123; FIGS. 4A to 4E are diagrams for explaining an example image reading method; FIG. 5 is a diagram for explaining an example image storage method; FIG. 6 is a flow chart for a control task for the operation unit 123; FIG. 7 is a flow chart for a trial copying process among the control in the idle state of the operation unit 123; FIG. 8 is a flow chart for the control of a copying sequence task according to the invention; FIG. 9 is a flow chart for a trial copying intermediate control operation; FIG. 10 is a diagram showing a trial copying selection display screen; FIG. 11 is a diagram showing a trial copying mode ON display screen; FIG. 12 is a diagram showing a trial copying display screen; FIG. 13 is a diagram showing a setting change selection screen; FIG. 14 is a diagram showing a resetting screen; and FIG. 15 is a diagram showing a trial copying display screen after the resetting.

The image forming apparatus of the invention will now be described while referring to the accompanying drawings.

FIG. 1 is a cross-sectional view of the structure of a reader unit 1 and a printer unit 2. The configuration and the operation of these components will now be described.

An original document stacked on a document feeder 101 is conveyed sheet by sheet to a document mounting glass 102. When the document has reached a predetermined position on the document mounting glass 102, a lamp 103 of a scanner is turned on, and a scanner unit 104 is displaced to expose the document. Light reflected by the document is transmitted via mirrors 105, 106 and 107 and a lens 108 to a CCD image sensor 109 (hereinafter referred to as a CCD).

FIG. 2 is a circuit block diagram showing the signal processing configuration of the reader unit 1. The configuration and the operation of the reader will now be explained.

In FIG. 2, photoelectric conversion is performed for the light reflected by the document and transmitted to the CCD 109, and electric signals for red, green and blue (R, G and B) colors are obtained. The color information obtained by the CCD 109 is amplified by succeeding amplifiers 110R, 110G and 110B in accordance with the input signal level of an A/D (analog-to-digital) converter 111. The signal output by the A/D converter 111 is transmitted to a shading circuit 112, which then corrects for the uneven distribution of light by the lamp 103 and the uneven light sensitivity of the CCD 109. As signal from the shading circuit 12 is transmitted to a Y signal generation/color detection circuit 113 and to an external I/F (interface) switching circuit.

The Y signal generation/color detection circuit 113 employs the following equation to calculate the signal received from the shading circuit 112, and to obtain a Y signal:

$$Y=0.3R+0.6G+0.1B.$$

Further, a color detection circuit is provided to separate the R, G and B signals into signals for seven colors, and to output these signals. The signals output by the Y signal generation/ detection circuit 113 are then transmitted to a magnification change/repeat circuit 114. The magnification in the sub-scanning direction is changed by using the scanning speed of the scanner unit 104, and the magnification in the main scanning direction is changed by the magnification change/repeat circuit 114. Furthermore, multiple like images can be output by the magnification change/repeat circuit 114. The contour/edge emphasis circuit 115 obtains edge emphasis and contour information by emphasizing the high-frequency element of a signal received from the magnification change/repeat circuit 114. The signal from the contour/edge emphasis circuit 115 is transmitted to a marker area judgement/contour creation circuit 116 and a patterning/fattening/masking/trimming circuit 117.

The marker area judgement/contour creation circuit 116 reads a portion of the document drawn using a marker pen of a designated color, and generates contour information for the marker. Then, the patterning/fattening/masking/trimming circuit 117 employs the contour information to perform fattening, masking or trimming, and also performs patterning by using a color detection signal received from the Y signal generation/color detection circuit 113.

When a signal is to be output by the patterning/fattening/masking/trimming circuit 117 to the printer unit 2, the signal is selected by an image data selector circuit 118, which will be described later, and is transmitted to a laser driver 119, which thereafter converts the received signal into a signal for driving a laser. The signal is then transmitted by the laser driver 119 to the printer unit 2, and a visible image is formed.

<Explanation of Image Memory 120>

In FIG. 2, the image memory 120 includes a function whereby, in accordance with a method that will be described later, image data received from the image data selector circuit 118 are stored at a designated location in the image memory 120 or are read therefrom, and through a rotation process, the images are synthesized in the memory.

A CPU 122, which controls the reader unit 1, includes a ROM 124 used for storing a control program and an error processing program, a RAM 125 used as a work area for various programs, and various timer controller. An operation unit 123 is provided with various keys used to instruct an image operation, such as the editing of image contents and the number of copies relative to the image process of the reader unit 1, and a display unit for displaying the manipulation contents.

FIG. 3 is a detailed diagram showing the operation unit 123 for the invention. Various keys and a liquid crystal display unit 301, which is a liquid display device consisting of a dot matrix, are arranged on the operation unit 123.

The liquid crystal display unit 301 displays the state of the apparatus, the number of copies, the magnification, the selected sheet type and various operating screens, and is operated by a control key.

A start key 303 is used to start copying, and a return key (reset key) 202 is used to return a set mode to the standard state. Ten keys, 0 to 9, are used to enter the number of copies and the zooming magnification, and a clear key is provided that is used to clear entries. A density key 306 is used to increase or decrease the density, and the density adjustment obtained by this key 306 is displayed in a display portion 307. A key portion 308 is a key and a display portion for turning on and off the automatic density adjustment function. A key 309 is used to select a paper feeding level and automatic paper feeding, and the selected state is displayed on the liquid display unit 301. A key 311 is used to set the standard magnification, or a reduction/increase in the magnification based on the standard size. A key 310 is used to set an automatic magnification mode, and the selected state is also displayed on the liquid crystal display unit 301.

The image storing method and the image reading method will now be described while referring to FIGS. 4A to 4E.

Figure 4A:
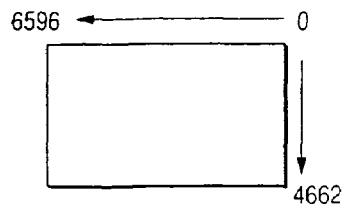
FIGS. 4A, 4B, 4C, 4D and 4E are diagrams for explaining an example image reading method.
Figure 4B:
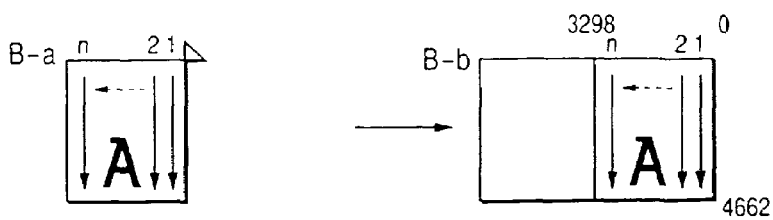

In FIG. 4A, the storage area for one image memory is shown. In this invention, capacity of the storage area is sufficient to hold the data for an A3 sheet, size, and is constituted by 4661 vertical bits and 6596 horizontal bits. As is shown in FIG. 5, one image layout area and image storage areas for storing the images for 100 sheets are provided. In an example in FIG. 4B, a document image is stored in the image memory. A document placed as in a state B-a is read in order in the direction indicated by an arrow. And as in a state B-b, address (0,0) is designated so that it can be incremented in the X direction and in the Y direction beginning at the start position, and when the first line has been read, the counter in the Y direction is incremented and the data is written in the direction leading toward address (0, 4661). When the second line is read, the counter in the X direction is incremented, and the data is written in the direction leading from address (1, 0) to address (1, 4661). When the third line is read, the counter in the X direction is again incremented, and the data is written from address (2, 0) to address (2, 4661). The reading and writing of data is repeated in this manner until the last data is written at address (3297, 4661).

The process in FIG. 4B for reading image data from the image memory will now be described while referring to FIGS. 4C and 4D. As in a state C-a, while address (3271, 0) is designated as the start position, and decrementation and incrementation are respectively designated for the counter in the X direction and the counter in the Y direction, the first line is read by decrementing the X counter. Then, the Y counter is incremented, and the second line is read in the direction leading from address (3297, 1) to address (0, 1). Therefore, by reading data in this manner, the image in a state C-b is obtained.

For the thus stored data, while the address (0, 0) is designated as the start position and incrementation and decrementation are respectively designated for the counter in the X direction and the counter in the Y direction, the first line is read by incrementing the Y counter in the direction leading toward address (0, 4661), as in a state D-a.

Following this, the X counter is incremented, and the second line is read in the direction leading from address (1, 0) to address (1, 4661). The image in a state D-b is obtained by reading the data in this manner.

Figure 4C:
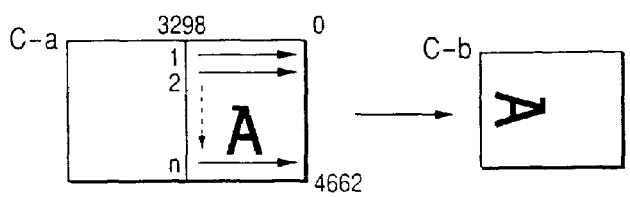
Figure 4D:
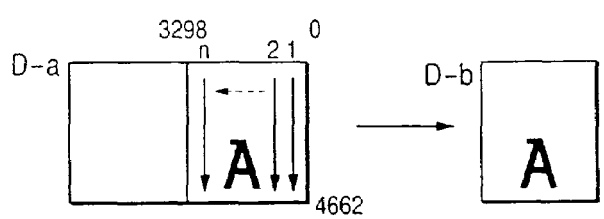
Figure 4E:
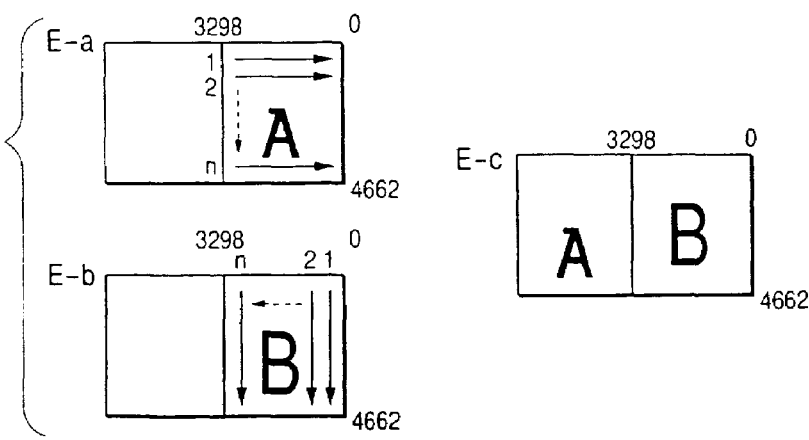

Therefore, when the A4 document in the state B-a is read in the direction shown in FIG. 4C, the image can be read without being rotated.

The image layout memory will now be explained. When, as previously described, individually stored images in states E-a and 4E-b are read and are written to desired location in the image layout memory, separate document images can be synthesized in the memory, as in a state E-c.

<Explanation for Printer Unit 2>

The configuration and the operation of the printer unit 2 will now be described, while referring to FIG. 1.

An image signal supplied to the printer unit 2 is converted into a demodulated light signal by an exposure controller 201, and this light is used to expose a photosensitive member 211. A latent image is formed on the photosensitive member 211 by the light, and is developed by a developing device 212. A transferring sheet is conveyed by a transferring sheet loading unit 214 or 215 in synchronization with the timing for the leading edge of the developed image, and the developed image is transferred to the sheet by a transferring device 216. The image is then fixed to the transferring sheet by a fixing device 217, and the resultant sheet is discharged to the outside of the apparatus by a discharge unit 218. The transferring sheet output by the discharge unit 218 is passed through a punch unit 250, and is punched when the punching function is active. The transferring sheet is then conveyed to a sorter 230, and is sorted into individual bins when the sorting function of the sorter 230 is active, or is discharged to the top bin when the sorting function is not active.

Next, a method for outputting sequentially read images to both sides of a single output sheet will be described.

A sheet to which an image has been fixed by the fixing device 217 is first conveyed to the discharge unit 218 whereat the sheet conveying direction is inverted and the sheet is again conveyed to a transferring sheet re-feeding unit 221 via a conveying direction switching unit 219. When the next document is set, the document image is read in the same manner, and the transferring sheet is supplied from the transferring sheet re-feeding unit 221, so that two document images are printed on a single sheet on the obverse and reverse faces.

The trial copying operation that is most relevant to the invention will now be described while referring to the flow charts in FIGS. 6 to 9 and FIGS. 10 to 15.

First Embodiment

FIG. 6 is a flow chart showing the control task for the operation unit 123 and the liquid crystal unit 301. This control section is activated when the apparatus is powered on, and is always set in the active state.

At step S601, a check is performed to determine whether the apparatus is in the idle state. The idle state is the state wherein no jobs, other than a copying job, are currently being executed. When the decision is YES, program control advances to step S602, and control is exercised in the idle state. When the decision is NO, program control is shifted to step S603, whereat a check is performed to determine whether the apparatus performing a copying operation. When a copying operation is currently being performed, the decision at step S603 is YES, and program control advances to step S604 to provide control for the operation. When the decision at step S603 is NO, program control is shifted to step S605, whereat a check is performed to determine whether the apparatus is in the trial copying intermediate state. The trial copying intermediate state is the state wherein, when the trial copying for one set has been completed, the job is temporarily halted and the user operation is permitted. This state will be described in detail later.

When the decision at step S605 is YES, program control advances to step S606 to control the trial copying intermediate state. When the decision at step S605 is NO, program control returns to step S601.

An explanation will now be given, while referring to the flow chart in FIG. 7, for the trial copying control, which is especially related to the invention, during the control process performed by the operation unit 123 in the idle state at step S602.

In the idle state, the screen in FIG. 10 is displayed, and the user can set a numeral and a copy mode, such as sheet selection and sorting.

In FIG. 10, a trial copying key 500 is used to set the trial copying. This key 500, which is normally not displayed, is displayed in accordance with the mode setting state. This will be described below while referring to FIG. 7.

At step S701 in FIG. 7, a check is performed to determine whether a numeral has been entered using the ten keys in the key group 205. When the decision is YES, at step S702, the numeral is set. This numeral is maintained unless it is cleared or reset by the user. Program control then advances to step S703.

When the decision at step S701 is NO, program control is shifted to step S703. At step S703, a check is performed to determine whether a mode other than that indicated by the numeral, such as the mode for sheet selection, sorting or two-faced copying, has been entered. If the decision at step S703 is NO, program control is shifted to step S705. If the decision is YES, program control advances to step S704, whereat the input mode is set and program control advances to step S705.

At steps S705 and S706, a check is performed to determine whether the numeral is equal to or greater than one, or whether the sorting mode has been set. When both conditions are YES, program control advances to step S707, and the trial copying key 500 in FIG. 10 is displayed. That is, since it is meaningless to perform trial copying for the non-sorting mode or for copying when the numeral "1" is set, the trial copying key 500 is not displayed. At step S708, a check is performed to determine whether the trial copying key 500 has been turned on. When the trial copying key 500 is in the ON state, at step S710 the trial copying mode is set to ON. At this time, the trial copying key 500 is inverted to black, as is shown in FIG. 11. When it is ascertained at step S708 that the trial coping key is not turned on, or when the decision at step S705 or S706 is NO, program control is shifted to step S709, and the trial copying mode is turned off.

Then, at step S711, a check is performed to determine whether the start key 203 has been depressed. When the decision is NO, program control returns to step S701, and the process for the idle state is repeated. When the decision is YES, program control advances to step S712, and the copying sequencer control task is activated. At this time, data for the numeral, the trial copying mode and the other mode that were set previously are transmitted from the operation unit control task to the copying sequence task.

Program control thereafter advances to step S713, whereat the copying sequence is shifted to the operating state, and the idle state is terminated.

The control process particularly related to the invention in the copying sequence task will be descried while referring to the flow chart in FIG. 8.

When the copying sequence task is activated, first, at step S801 a check is performed to determine whether the trial copying mode is set. When the decision is YES, program control advances to step S802, and the numeral is set to "1". This numeral is a temporary numeral that differs from the numeral set by the user and is used for another internal process, and in the trial copying mode, the mode enters to the intermediate state after one copy is obtained. Program control advances to step S803, and the operation unit control task is notified of the initiation of the trial copying operation. Upon receipt of this notification, the operation unit control task enters the process at step S604, and in this control, the display is switched to the screen shown in FIG. 12.

Program control advances to step S804, and the copying is started. In this process, a document is read, image data are stored in the image memory 120, and the image is copied for one set. When the process is completed, program control is shifted to step S806, and the mode is shifted to the trial copying intermediate state. This information is transmitted to the operation unit control task at step S805, and the process at step S606 in the trial copying intermediate state is performed.

The process in the intermediate state will now be described while referring to the flow chart in FIG. 9 and display screens in FIGS. 13 to 15.

In the intermediate state, the screen in FIG. 13 is displayed. On the screen in FIG. 13, a setting change key 601, a stop key 602 and a print start key 603 are provided.

At step S901 in FIG. 9, a check is performed to determine whether the step key 602 is depressed. When the decision is YES, program control is shifted to step S916, and a stop request is issued to the copying sequence task. At step S917, it is ascertained the copying sequence is performed in the idle state, and the trial copying intermediate control is terminated.

When the decision at step S901 is NO, program control advances to step S902, and a check is performed to determine whether the setting change key 601 is depressed to request the setting change. When the decision is YES, program control is shifted to step S911, and at this time, the display is changed to the resetting screen in FIG. 14. At step S911, a check is performed to determine whether a specific ten-key of the key group 205 is depressed and the numeral is changed. When the decision is YES, the entered numeral is newly set at step S912. After this process, or when the decision at step S911 is NO, program control advances to step S913.

On the resetting screen, a sheet select key 701, a sort setting key 702, a margin setting key 703, a density setting key 704 and a two-faced copying setting key 705 are displayed, and the mode change other than the numeral change is permitted. At step S913, a check is performed to determine whether the change of any of these modes has been instructed, and if so, program control advances to step S914 whereat the mode is resetting.

After the process at step S914, or when the decision at step S913 is NO, program control advances to step S915, whereat a check is performed to determine whether the user completes the setting change and depresses a close key 706 in FIG. 14. If the decision is NO, program control returns to step S911.

When the decision at step S915 is YES, or when the decision at step S902 is NO, program control is shifted to step S903. When specific setting change has been entered at steps S911 to S915, program control is shifted to step S904. At this time, a trial copying key 801 is displayed. By depressing the trial coping key 801, the user can perform trial copying again based on the mode that is changed.

At step S904, a check is performed to determine whether the trial copying key 801 has been depressed. When the decision is YES, program control advances to step S909, and the restart of the copying sequence is requested. In this process, the mode that is changed, and other mode data that is originally set are transmitted from the control task to the copying sequence task.

When the decision at step S904 is NO, program control advances to step S905, whereat a check is performed to determine a print start key 603 is depressed. By depressing the print start key 603, the user can print data in the mode that is set or reset, by the number of copies equivalent to a predetermined numeral, and thereafter terminates the copying job.

When the decision at step S905 is NO, program control returns to step S901, and the process in the intermediate state is repeated.

When the decision at step S905 is YES, program control advances to step S906.

At step S906, a check is performed to determine whether the setting change in the intermediate state has been instructed. When the decision is NO, program control advances to step S907, and the numeral that has been set is decremented and a new numeral is set. When the decision is YES, this process is not performed, and the numeral that is reset in the intermediate state, or the numeral that was previously set is maintained.

After the process at step S907, or when the decision at step S906 is YES, program control is shifted to step S908, and the trial copying mode is released. Thus, the copying is performed by the number of sets equivalent to the numeral determined by the above method, and is thereafter terminated.

After this process, program control advances to step S909, and a restart request for the copying sequence task is issued. At step S910, it is confirmed that the copying sequence has been initiated, and the trial copying intermediate control is terminated.

The copying sequence task beginning with the intermediate state will now be described while referring again to FIG. 8.

In the intermediate state, at step S807, a check is performed to determine whether the restart request is issued from the operation unit control task. When the decision is NO, program control is shifted to step S809, and a check is performed to determine whether a stop request is received. When the decision is NO, program control returns to step S807, and the process in the intermediate state is repeated. When the decision at step S809 is YES, program control advances to step S810, and the copying sequence that is currently halted is terminated. Then, program control is shifted to step S813. The process after step S813 will be descried later.

When the decision at step S807 is YES, program control advances to step S808, whereat a check is performed to determine whether the trial copying mode is still set. When the decision is YES, program control returns to step S802, and the trial copying operation is performed again. When the decision at step S808 is NO, program control is shifted to step S811, and the operation unit control task is notified of the start of the copying operation. At step S812, the copying operation is initiated in the mode that is reset at the restart time and based on the numeral data.

After the copying process is completed, program control is shifted to step S813, and the operation unit control task is notified that the copying process is completed and the idle state is recovered. The copying sequence task is thereafter terminated.

It should be noted that document reading is not performed during re-trial copying in the intermediate state, or during the copying after the trial copying is released, and that, first, the document image data is read from the image memory 120, and is printed in accordance with the mode that is currently set.

Through the above described control, the trial copying is performed in the following manner.

First, when the trial copying is set, always, image data are printed by one copy, and the operating state is shifted to the resettable, intermediate state. The above described operation is employed to perform the re-trial copying in the intermediate state.

In the printing using the print start key 603, or the printing after the trial copying mode is released, the numeral is set as follows.

First, when the mode is changed in the intermediate state, the printing is performed by the number equivalent to the numeral that is previously set. This is because it is assumed that the number of copies obtained by the mode change is that the user desires to obtain, and that the user does not count the trial copy that was previously output.

When the mode is not changed in the intermediate state, it is assumed that the user is satisfied with the trial copy, and that the user has a desire to continue printing. In this case, the trial copy is regarded as effective, and the printing is continued by the number obtained by decrementing the numeral by one, so that the user can obtain the copies by the numeral the user originally desires.

Further, while the printing is performed in the trial copying mode, always only one set of copy is provided. However, the numeral that is originally set is not changed.

That is, the user need not change the numeral when he or she has performed the trial copying and changes the mode later, so that the number of copies that the user desires can be finally provided, and this method is extremely effective.

Other Embodiment

In the above embodiment, the present invention has been applied for copying; however, the invention is not limited to this.

For example, a box function has been proposed for a digital copying machine.

According to this function, image data received from a scanner or an external device can be permanently stored in an image memory, and be printed when necessary. The trial printing can be applied for the printing using this box function, and the application of the present invention is also effective.

Further, the trial printing can also be applied for a system for receiving facsimile data, temporarily storing the data in a memory, and reading and printing the data by the instruction from a user. The application of the invention is also effective.

As is described above, the invention can be applied for all the apparatuses that can read an image from a memory and print it, and that permits predetermined mode change each time as the image is read.

In these embodiments, a check is performed to determine whether the mode is changed in the temporarily halted state where the trial copying for one set is completed, and then, the numeral is automatically changed accordingly. That is, when the numeral is changed in the temporarily halted state in the trial copying mode, in the coping immediately after the trail copying mode is released, copies are made by the number equivalent to the numeral that is newly set. When the mode other than the numeral is changed, the copying is performed by the number equivalent to the numeral that is set. When the mode is not changed at all, copying is performed by the number obtained by decrementing the numeral by one. Further, while only one set is defined for trial copying, the numeral that is set is maintained unchanged. Thus, the number of copies that the user desires can be provided, without changing the numeral setting.

The present invention has been explained during the course of the preferred embodiments; however, the present invention is not limited to these embodiments, and can be variously modified without departing from the scope of the invention.

What is claimed is:

1. A control method of an image forming apparatus which has image forming means, said control method comprising:
   a setting step of setting an image forming condition;
   an inputting step of inputting image data;
   a first accepting step of accepting, from a user, a first instruction for instructing the image forming a apparatus to execute first trial image forming;
   a first controlling step of controlling, in response to the first instruction accepted in said first accepting step, the image forming means to execute the first trial image forming using the image data input in said inputting step based on the image forming condition set in said setting step;
   a second accepting step of accepting, from the user, a second instruction for changing the image forming condition set in said setting step, after the first trial image forming is executed in said first controlling step;
   a third accepting step of accepting, from the user, a third instruction for instructing the image forming apparatus to execute second trial image forming in a case where the second instruction is accepted in said second accepting step, wherein the third instruction can not be accepted in a case where the second instruction is not accepted in said second accepting step;
   a second controlling step of controlling, in response to the third instruction accepted in said third accepting step, the image forming means to execute the second trial image forming using the image data input in said inputting step based on the image forming condition changed according to the second instruction;
   a fourth accepting step of accepting, from the user, a fourth instruction for instructing the image forming apparatus to execute normal image forming; and
   a third controlling step of controlling, in response to the fourth instruction accepted in said fourth accepting step, the image forming means to execute the normal image forming using the image data input in said inputting step based on the image forming condition changed according to the, second instruction in a case where the second instruction is accepted in said second accepting step, and of controlling the image forming means to execute the normal image forming using the image data input in said inputting step based on the image forming condition set in said setting step, in a case where the second instruction is not accepted in said second accepting step.

2. A control method according to claim 1, wherein, in the inputting step, the image data is input from at least either a scanner or an external apparatus.

3. A control method according to claim 1, wherein the image forming condition is stored in a memory, and
   wherein, in said third controlling step, the image forming means is controlled to execute image forming based on the image forming condition stored in the memory.

4. A control method according to claim 1, wherein
   in the normal image forming, the image forming is executed according to a numeral designated in the image forming condition, and
   in the first trial image forming and the second trial image forming, the image forming is executed according to a predetermined numeral irrelevant to the numeral designated in the image forming condition.

5. A control method according to claim 4, wherein the numeral designated in the image forming condition is "2" or more.

6. A control method according to claim 4, wherein the predetermined numeral is "1".

7. An image forming apparatus comprising:
   image forming means for performing an image forming operation; and
   an operation unit configured to execute a control method including:
   a setting step of setting an image forming condition;
   an inputting step of inputting image data;
   a first accepting step of accepting, from a user, a first instruction for instructing the image forming a apparatus to execute first trial image forming;
   a first controlling step of controlling, in response to the first instruction accepted in said first accepting step, the image forming means to execute the first trial image forming using the image data input in said inputting step based on the image forming condition set in said setting step;
   a second accepting step of accepting, from the user, a second instruction for changing the image forming condition set in said setting step, after the first trial image forming is executed in said first controlling step;
   a third accepting step of accepting, from the user, a third instruction for instructing the image forming apparatus to execute second trial image forming in a case where the second instruction is accepted in said second accepting step, wherein the third instruction can not be accepted in a case where the second instruction is not accepted in said second accepting step;

a second controlling step of controlling, in response to the third instruction accepted in said third accepting step, the image forming means to execute the second trial image forming using the image data input in said inputting step based on the image forming condition changed according to the second instruction;

a fourth accepting step of accepting, from the user, a fourth instruction for instructing the image forming apparatus to execute normal image forming; and a third controlling step of controlling, in response to the fourth instruction accepted in said fourth accepting step, the image forming means to execute the normal image forming using the image data input in said inputting step based on the image forming condition changed according to the, second instruction in a case where the second instruction is accepted in said second accepting step, and of controlling the image forming means to execute the normal image forming using the image data input in said inputting step based on the image forming condition set in said setting step, in a case where the second instruction is not accepted in said second accepting step.

8. A computer-readable storage medium for an image forming apparatus which has image forming means, said storage medium storing a program to cause the image forming apparatus to execute:

a setting step of setting an image forming condition;

an inputting step of inputting image data;

a first accepting step of accepting, from a user, a first instruction for instructing the image forming apparatus to execute first trial image forming;

a first controlling step of controlling, in response to the first instruction accepted in said first accepting step, the image forming means to execute the first trial image forming using the image data input in said inputting step based on the image forming condition set in said setting step;

a second accepting step of accepting, from the user, a second instruction for changing the image forming condition set in said setting step, after the first trial image forming is executed in said first controlling step;

a third accepting step of accepting, from the user, a third instruction for instructing the image forming apparatus to execute second trial image forming in a case where the second instruction is accepted in said second accepting step, wherein the third instruction can not be accepted in a case where the second instruction is not accepted in said second accepting step;

a second controlling step of controlling, in response to the third instruction accepted in said third accepting step, the image forming means to execute the second trial image forming using the image data input in said inputting step based on the image forming condition changed according to the second instruction;

a fourth accepting step of accepting, from the user, a fourth instruction for instructing the image forming apparatus to execute normal image forming; and a third controlling step of controlling, in response to the fourth instruction accepted in said fourth accepting step, the image forming means to execute the normal image forming using the image data input in said inputting step based on the image forming condition changed according to the second instruction in a case where the second instruction is accepted in said second accepting step, and of controlling the image forming means to execute the normal image forming using the image data input in said inputting step based on the image forming condition set in said setting step in a case where the second instruction is not accepted in said second accepting step.

* * * * *